May 17, 1966   F. M. NASH   3,252,052
LEAKAGE DETECTION AND CONTROL CIRCUIT
Filed Aug. 23, 1963   2 Sheets-Sheet 1

INVENTOR.
FLOYD M. NASH
BY
Bruce & Brosler
HIS ATTORNEYS

May 17, 1966  F. M. NASH  3,252,052
LEAKAGE DETECTION AND CONTROL CIRCUIT
Filed Aug. 23, 1963  2 Sheets-Sheet 2

INVENTOR.
FLOYD M. NASH
BY
Bruce & Brosler
HIS ATTORNEYS

United States Patent Office 3,252,052
Patented May 17, 1966

3,252,052
LEAKAGE DETECTION AND CONTROL CIRCUIT
Floyd M. Nash, Little Rock, Ark., assignor to Jacuzzi Bros., Incorporated, a corporation of California
Filed Aug. 23, 1963, Ser. No. 304,008
8 Claims. (Cl. 317—18)

My invention relates to safety control in alternating current systems, and more particularly in connection with undesired current leakage in electrical apparatus, due primarily to deterioration or breakdown of insulation.

Electrical apparatus is normally protected against current leakage, by insulation. By reason of wear, normal exposure, abuse . . . etc., the insulation may deteriorate and likewise its insulating qualities. When such condition develops, the user of the apparatus unknowingly exposes himself to shock and probability of serious injury or death.

Among the objects of my invention are:
(1) To provide a novel and improved electrical current leakage detection circuit;
(2) To provide a novel and improved electrical current leakage detection circuit, which is very sensitive in detecting leakage current;
(3) To provide a novel and improved electrical current leakage detection circuit which will automatically disconnect the defective apparatus from its power supply source, when an undesired leakage condition develops.

Additional objects of my invention will be brought out in the following description of a preferred embodiment of the same, taken in conjunction with the accompanying drawings wherein.

Figure 1:
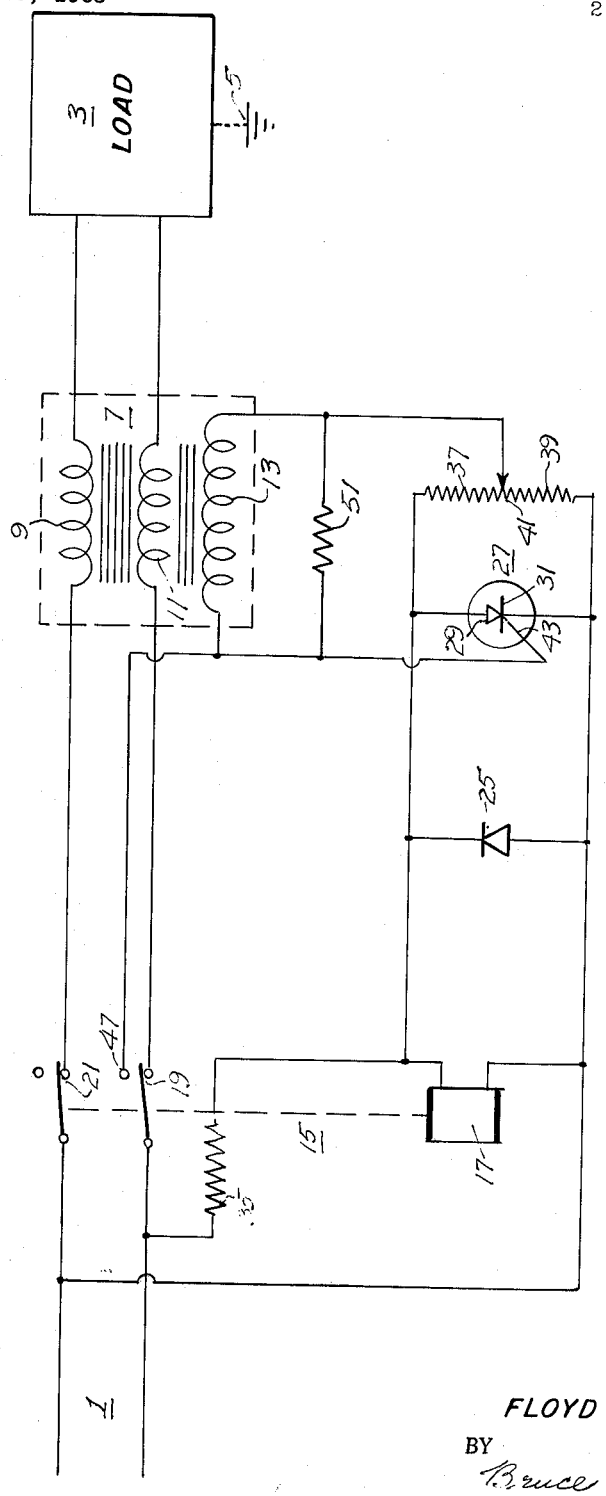
FIG. 1 is a circuit diagram depicting one form of my invention.

Referring to the drawings for details of my invention, the same is for use in connection with a main electrical circuit 1 supplying power to a load 3, which may be any type of electrical apparatus or equipment subject to a probable breakdown or deterioration of insulation, to permit current leakage to electrical ground 5, which could develop into a dangerous condition for individuals who might accidentally or otherwise make contact therewith.

The leakage detection and control circuit comprises a differential transformer 7 having a pair of like primary windings 9, 11 adapted to be connected in such main circuit, in bucking relationship, that is with one primary winding in one line of the main circuit, and the other in the second line of the main circuit and in such direction as to nullify creation of flux when both windings carry current of the same value or magnitude.

In coupling relationship to the primary windings, is a secondary winding 13 which, in the absence of flux emanating from the primary windings, will develop no voltage, but in the presence of a differential flux due to a difference developing between the value of the currents flowing through the respective primary windings, will develop a potential which may be descriptively referred to as a differential voltage.

In conjunction with the differential transformer, I provide a relay 15 having a winding 17 adapted for connection to a source of electrical energy, which preferably will be the main circuit to the load. Associated with the relay winding, as part of the relay, are two pairs of contacts 19, 21, which in the embodiment of FIG. 1, will be of the normally closed type, that is with the relay winding in its de-energized state. These normally closed contacts are for inclusion in the main circuit to function as a switch capable of opening the circuit to the load in response to energization of the winding of the relay, and will preferably be connected on the load side of the relay winding connections to the main circuit.

The relay winding of the circuit of FIG. 1 is normally shunted to preclude energization thereof when thus connected to the main circuit, such condition being the desired condition, so long as the load is functioning in a safe condition.

Such normal shunting of the relay winding is accomplished by a diode 25 connected across the relay winding, along with a transistor in the form of a silicon controlled switch 27 with non-linear characteristics like a fully opened and fully closed valve, which is also connected across the relay winding but in the reverse direction, the emitter 29 and base electrode 31 of the silicon controlled switch being the elements so connected.

To avoid any direct shorting of the main circuit when the relay winding 17 is connected across such circuit, under the conditions just described, a current limiting, voltage dropping resistor 35 is included in one of the leads from the relay winding.

Removal of the shunt condition from across the relay winding to thereby subject the relay winding to energization from the main circuit when connected thereto, can be effectively realized by rendering the silicon controlled switch also non-conductive in the direction in which it is normally conductive, which will then permit the relay winding to be energized by alternate half cycles of current.

With this in mind, I connect a potentiometer or an equivalent pair of series-connected resistors 37, 39 between the emitter and base electrodes of the silicon controlled switch. Between the junction 41 of these two resistors and the collector electrode 43 of the silicon controlled switch, I connect the secondary winding 13 of the differential transformer.

It will be appreciated, that so long as the load is functioning in a safe manner, the current through both primary windings of the differential transformer will be of the same value, and consequently, the flux which would otherwise be generated by either one of the primary windings will be completely nullified by the other.

However, should leakage current develop to ground from some point in the electrical equipment constituting the load, an unbalance in current will develop between that flowing in one of the primary windings and that flowing through the other primary winding, and a voltage will be induced in the secondary winding, in response to the differential flux thereby resulting from such unbalance of currents, and this voltage will serve to bias the silicon control switch to the point of rendering it non-conductive, and when this happens, the relay winding can become energized, to open its normally closed contacts, and thus open the main circuit to the load.

In the absence of anything further, the removal of the load will render the differential transformer neutral, with resulting loss of the differential voltage which brought about the energization of the relay winding. Consequently, so long as the defective condition of the load persists, the circuit will cycle, to periodically render the relay winding energized and de-energized, but should the condition of the load correct itself, the cycling of the circuit will stop when the relay winding next becomes de-energized.

It may be preferable, however, when the load does develop leakage current, to disconnect the load, and maintain it disconnected until the current condition has been rectified. To accomplish this, a relay is employed having a back contact 47 which is connected to the collector electrode 43. Then when the relay winding next becomes energized, which will happen when the load develops leakage current, the back contact will be connected to one side of the main circuit to establish the equivalent of a holding circuit.

To re-establish operation of the circuit, following correction of the faulty load condition, will then necessitate manually re-establishing the relay condition which will re-connect the load to the main circuit.

For most efficient operation of the circuit, a matching impedance 51 is connected across the secondary winding of the differential transformer.

Figure 2:
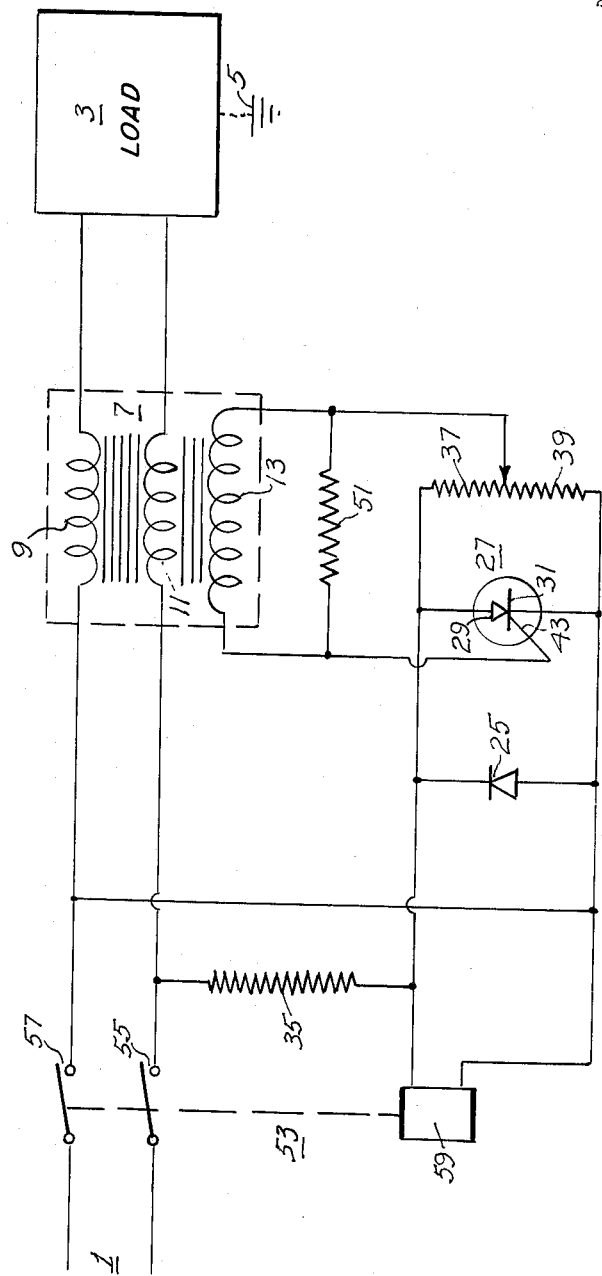
FIG. 2 is a circuit diagram depicting another form of the invention.

In the modified form of the circuit depicted in FIG. 2 of the drawings, the relay 53 is preferably one normally having open contacts 55, 57, and the relay winding 59 is preferably connected to the main circuit on the load side of these contacts. The transistor or silicon controlled switch 27 is biased so as to be normally non-conducting, and is rendered conductive only when a voltage is induced in the secondary winding 13.

The fact that the main circuit is opened on the supply side of the connections of the relay winding thereto, will avoid the necessity for a holding circuit, in that the relay cannot be energized until its contacts are closed and this operation must be performed manually.

The fact that the silicon controlled switch is so biased as to be normally non-conducting, means that the silicon controlled switch will be conductive only for the brief moments necessary to bring about de-energization of the relay winding to disconnect the relay and the load from the main circuit. Along with the elimination of the holding circuit, this normal non-conductivity of the silicon controlled switch provides an additional advantage.

From the foregoing description of my invention, it will be apparent that the same will satisfy the objects thereof, and while I have illustrated and described the same in two forms and in considerable detail, I do not desire to be limited in my protection to the specific details so illustrated and described, except as may be necessitated by the appended claims.

I claim:

1. Leakage detection and control circuit for detection of undesired current leakage from a single phase electrical load when connected in a main circuit to a single phase source of electrical energy, said leakage detection and control circuit comprising
   a differential transformer having
   a pair of like primary windings for connection in such main circuit in bucking relationship to nullify creation of flux in absence of leakage current, when both windings carry current of same value, and
   a secondary winding in coupling relationship to both said primary windings for developing a differential voltage in response to a predominance of flux generated in either of said primary windings, resulting from flow of leakage current from such load,
   means energizable from such main circuit and capable of responding to such differential voltage for opening such main circuit when connected thereto, and means for retaining such main circuit open upon such opening thereof.

2. Leakage detection and control circuit for detection of undesired current leakage from a single phase electrical load when connected in a main circuit to a single phase source of electrical energy, said leakage detection and control circuit comprising
   a differential transformer having
   a pair of like primary windings for connection in such main circuit in bucking relationship to nullify creation of flux in the absence of leakage current, when both windings carry current of same value, and
   a secondary winding in coupling relationship to both said primary windings for developing a differential voltage in response to a predominance of flux generated in either of said primary windings, resulting from flow of leakage current from such load, and
   means for responding to such differential voltage for opening such main circuit when connected thereto, said means including
   a relay having a winding for connection to a source of electrical energy, and contacts for inclusion in such main circuit, to connect and disconnect such load,
   means for connecting said winding to said source of electrical energy as a source of power for said winding.
   a current limiting resistor in series with said windings,
   means coupled to said secondary winding and responsive to such differential voltage for changing the prevailing condition of said relay with resulting opening of said contacts,
   and means for retaining said contacts in open condition upon such opening thereof.

3. Leakage detection and control circuit for detection of undesired current leakage from a single phase electrical load when connected in a main circuit to a single phase source of electrical energy, said leakage detection and control circuit comprising
   a differential transformer having
   a pair of like primary windings for connection in such main circuit in bucking relationship to nullify creation of flux in absence of leakage current, when both windings carry current of same value, and
   a secondary winding in coupling relationship to both said primary windings for development of a differential voltage in response to a predominance of flux generated in either of said primary windings, resulting from flow of leakage current from such load, and
   means for responding to such differential voltage for opening such main circuit when connected thereto, said means including
   a relay having a winding for connection to a source of electrical energy, and contacts for inclusion in such main circuit, to connect and disconnect such load,
   means for connecting said winding to said source of electrical energy as a source of power for said windings.
   a current limiting resistor in series with said winding,
   and means coupled to said secondary winding and responsive to such differential voltage for changing the prevailing condition of said relay with resulting opening of said contacts, and means comprising
   means for normally conditioning said relay winding when connected to said source of electrical energy, to maintain its contacts closed during a normal load condition in such main circuit, and when said relay contacts are in such main circuit,
   said means responding to a differential voltage from said secondary winding to alter the condition of said relay winding such as to cause opening of said contacts to disconnect such load.

4. Leakage detection and control circuit for detection of undesired current leakage from a single phase electrical load when connected in a main circuit to a single phase source of electrical energy, said leakage detection and control circuit comprising
   a differential transformer having
   a pair of like primary windings for connection in such main circuit in bucking relationship to nullify creation of flux in the absence of leakage current, when both windings carry current of same value, and
   a secondary winding in coupling relationship to both said primary windings for development of a differential voltage in response to a predominance of flux generated in either of said primary windings, resulting from flow of leakage current from such load, and
   means for responding to such differential voltage for opening such main circuit when connected thereto, said means including
   a relay having a winding for connection to a source of electrical energy, and contacts for inclusion in such main circuit, to connect and disconnect such load, means for connecting said winding to said source of electrical energy as a source of power for said winding, a current limiting resistor in series with said winding, and means coupled to said secondary winding and responsive to such differential voltage for changing the prevailing condition of said relay with resulting opening of said contacts, said means comprising means for normally conditioning said relay winding when connected to said source of electrical energy, to maintain its contacts closed during a normal load condition in such main circuit, and when said relay contacts are in such main circuit, said last means including a diode connected across said relay winding a silicon controlled switch connected across said relay winding in reverse to said diode to constitute with said diode, an effective shunt across said winding, when said silicon controlled switch is rendered conductive in one direction, and means responsive to a differential voltage across the secondary winding of said differential transformer for changing the condition of said silicon controlled switch from its prevailing condition.

5. Leakage detection and control circuit for detection of undesired current leakage from a single phase electrical load when connected in a main circuit to a single phase source of electrical energy, said leakage detection and control circuit comprising a differential transformer having a pair of like primary windings for connection in such main circuit in bucking relationship to nullify creation of flux in the absence of leakage current, when both windings carry current of same value, and a secondary winding in coupling relationship to both said primary windings for development of a differential voltage in response to a predominance of flux generated in either of said primary windings, resulting from flow of leakage current from such load, and means for responding to such differential voltage for opening such main circuit when connected thereto, said means including a relay having a winding for connection to a source of electrical energy, and two pairs of normally closed contacts for inclusion in such main circuit to open such main circuit when said winding is energized, means for connecting said winding to said source of electrical energy as a source of power for said winding, a current limiting resistor in series with said winding, and means coupled to said secondary winding and responsive to such differential voltage for causing energization of said relay with resulting opening of such main circuit, said means comprising means for normally shorting said relay winding when connected to said source of electrical energy, to maintain the same de-energized during a normal load condition in such main circuit, said last means including a diode connected across said relay winding, a silicon controlled switch connected across said relay winding in reverse to said diode to constitute with said diode, and effective shunt across said winding, when said silicon controlled switch is conductive, and means responsive to a differential voltage across the secondary winding of said differential transformer for changing the condition of said silicon controlled switch from a conductive to a non-conductive state, whereby to open said effective shunt across said relay winding and subject it to energization from such source of electrical energy when connected thereto, to effectively disconnect such load from such main circuit.

6. Leakage detection and control circuit for detection of undesired current leakage from a single phase electrical load when connected in a main circuit to a single phase source of electrical energy, said leakage detection and control circuit comprising a differential transformer having a pair of like primary windings for connection in such main circuit in bucking relationship to nullify creation of flux in the absence of leakage current, when both windings carry current of same value, and a secondary winding in coupling relationship to both said primary windings for development of a differential voltage in response to a predominance of flux generated in either of said primary windings, resulting from flow of leakage current from such load, and means for responding to such differential voltage for opening such main circuit when connected thereto, said means including a relay having a winding for connection to a source of electrical energy, and two pairs of normally open contacts for inclusion in such main circuit to close such main circuit when said winding is energized, means for connecting said winding to said source of electrical energy as a source of power for said winding.

a current limiting resistor in series with said winding, and means coupled to said secondary winding and responsive to such differential voltage for causing de-energization of said relay from an energized condition with resulting opening of such main circuit, said means comprising means for normally energizing said relay winding when connected to said source of electrical energy, to maintain said contacts closed during a normal load condtion in such main circuit, said last means including a diode connected across said relay winding, a silicon controlled switch connected across said relay winding in reverse to said diode to permit alternate half cycles of current through said relay winding when said silicon controlled switch is in a non-conductive state, and means responsive to a differential voltage across the secondary winding of said differential transformer for changing the condition of said silicon controlled switch from a non-conductive to a conductive state, whereby in conjunction with said diode, to shunt said relay winding and subject it to de-energization, to effectively disconnect such load from such main circuit.

7. Leakage detection and control circuit for detection of undesired current leakage from a single phase electrical load when connected in a main circuit to a single phase source of electrical energy, said leakage detection and control circuit comprising a differential transformer having a pair of like primary windings for connection in such main circuit in bucking relationship to nullify creation of flux in the absence of leakage current, when both windings carry current of same value, and a secondary winding in coupling relationship to both said primary windings for development of a differential voltage in response to a predominance of flux generated in either of said primary windings, resulting from flow of leakage current from such load, and means for responding to such differential voltage for opening such main circuit when connected thereto, said means including a relay having a winding for connection to a source of electrical energy, and two pairs of normally closed contacts for inclusion in such main circuit to open such main circuit when said winding is energized, means for connecting said winding to said source of electrical energy as a source of power for said winding, a current limiting and voltage dropping resistor in series with said winding, and means coupled to said secondary winding and responsive to such differential voltage for causing energization of said relay with resulting opening of such main circuit, said means comprising means for normally shorting said relay winding when connected to said source of electrical energy, to maintain the same de-energized during a normal load condition in such main circuit, said last means including a diode connected across said relay winding, a silicon controlled switch connected across said relay winding in reverse to said diode to constitute with said diode, an effective shunt across said winding when said silicon controlled switch is conductive, and means responsive to a differential voltage across the secondary winding of said differential transformer for changing the condition of said silicon controlled switch from a conductive to a non-conductive state, whereby to open said effective shunt across said relay winding and subject it to energization from such source of electrical energy when connected thereto, to effectively disconnect such load from such main circuit, and means for retaining such main circuit in its effectively open state.

8. Leakage detection and control circuit for detection of undesired current leakage from a single phase electrical load when connected in a main circuit to a single phase source of electrical energy, said leakage detection and control circuit comprising a differential transformer having a pair of like primary windings for connection in such main circuit in bucking relationship to nullify creation of flux in the absence of leakage current, when both windings carry current of same value, and a secondary winding in coupling relationship to both said primary windings for development of a differential voltage in response to a predominance of flux generated in either of said primary windings, resulting from flow of leakage current from such load, and means for responding to such differential voltage for opening such main circuit when connected thereto, said means including a relay having a winding for connection to a source of electrical energy, and two pairs of normally open contacts for inclusion in such main circuit, to close such main circuit when said winding is energized, means for connecting said winding to said source of electrical energy as a source of power for said winding, a current limiting resistor in series with said winding, and means coupled to said secondary winding and responsive to such differential voltage for causing de-energization of said relay from an energized condition with resulting opening of such main circuit, said means comprising means for normally energizing said relay winding when connected to said source of electrical energy, to maintain said contacts closed during a normal load condition in such main circuit, said last means including a diode connected across said relay winding, a silicon controlled switch connected across said relay winding in reverse to said diode to permit alternate half cycles of current through said relay winding when said silicon controlled switch is in a non-conductive state, and means responsive to a differential voltage across the secondary winding of said differential transformer for changing the condition of said silicon controlled switch from a non-conductive to a conductive state, whereby in conjunction with said diode, to shunt said relay winding and subject it to de-energization, to effectively disconnect such load from such main circuit, and means for retaining such main circuit in its effectively open state.

References Cited by the Examiner

UNITED STATES PATENTS

| | | | |
|---|---|---|---|
| 2,443,260 | 6/1948 | Matthews | 317—57 X |
| 3,058,036 | 10/1962 | Reuther et al. | 317—57 X |
| 3,158,786 | 11/1964 | Hurtle | 317—33 |
| 3,165,671 | 1/1965 | Mintz et al. | 317—27 |
| 3,181,032 | 3/1965 | Myers | 317—27 |
| 3,187,225 | 6/1965 | Mayer | 317—27 X |

STEPHEN W. CAPELLI, *Primary Examiner.*

SAMUEL BERNSTEIN, R. V. LUPO,
*Assistant Examiners.*